United States Patent [19]
Sezan et al.

[11] Patent Number: 5,473,383
[45] Date of Patent: Dec. 5, 1995

[54] MECHANISM FOR CONTROLLABLY DEINTERLACING SEQUENTIAL LINES OF VIDEO DATA FIELD BASED UPON PIXEL SIGNALS ASSOCIATED WITH THREE SUCCESSIVE INTERLACED VIDEO FIELDS

[75] Inventors: M. Ibrahim Sezan; Andrew J. Patti, both of Rochester, N.Y.

[73] Assignee: Eastman Kodak Company, Rochester, N.Y.

[21] Appl. No.: 259,830

[22] Filed: Jun. 15, 1994

[51] Int. Cl.$^6$ .................................................. H04N 7/01
[52] U.S. Cl. ........................................... 348/452; 348/448
[58] Field of Search ................................ 348/448, 452, 348/441, 714, 715; H04N 7/01

[56] References Cited

U.S. PATENT DOCUMENTS 4,937,667  6/1990  Choquet et al. ................ 348/448
5,051,826  9/1991  Ishii et al. ....................... 348/448
5,249,037  9/1993  Sagiyama et al. ............... 348/452

*Primary Examiner*—Victor R. Kostak
*Attorney, Agent, or Firm*—Peyton C. Watkins

[57] ABSTRACT

A hybrid deinterlace mechanism employs motion detection as a precursor to select the value for each missing pixel of a deinterlaced frame. If the missing pixel is found to belong to a steady or non-motion portion of the image, then its value is replaced by the corresponding value in the adjacent field (i.e., merging is performed). Otherwise, (where image motion is present) spatial interpolation, preferably edge-adaptive interpolation, is employed to determine the value of the missing pixel.

9 Claims, 5 Drawing Sheets

FIG. 4

| $c1$ | $c2$ | $c3$ | $c4$ | $c5$ | $c6$ |
|---|---|---|---|---|---|
| $c7$ | $c8$ | $c9$ | $c10$ | $c11$ | $c12$ |
| $c13$ | $c14$ | $c15$ | $c16$ | $c17$ | $c18$ |

| $c19$ | $c20$ | $c21$ | $c22$ | $c23$ | $c24$ |
|---|---|---|---|---|---|
| $c7$ | $c8$ | $c9$ | $c10$ | $c11$ | $c12$ |
| $c13$ | $c14$ | $c15$ | $c16$ | $c17$ | $c18$ |

| $c19$ | $c20$ | $c21$ | $c22$ | $c23$ | $c24$ |
|---|---|---|---|---|---|
| $c25$ | $c26$ | $c27$ | $c28$ | $c29$ | $c30$ |
| $c13$ | $c14$ | $c15$ | $c16$ | $c17$ | $c18$ |

MECHANISM FOR CONTROLLABLY DEINTERLACING SEQUENTIAL LINES OF VIDEO DATA FIELD BASED UPON PIXEL SIGNALS ASSOCIATED WITH THREE SUCCESSIVE INTERLACED VIDEO FIELDS

FIELD OF THE INVENTION

The present invention relates in general to an image signal processing technique for converting interlaced video signals into progressive or sequential signal format, and is particularly directed to a multiple interlaced image field processing mechanism, that is operative to generate pixel signals within each of sequential lines of a deinterlaced video data field associated with a prescribed field polarity, by selectively merging pixels from an immediately adjacent image field or performing interpolation among pixels of the field of interest, in dependence upon a determination of the presence or absence of image motion between successive frames of the same field polarity, opposite the prescribed field polarity, that immediately precede and follow the image field of interest.

BACKGROUND OF THE INVENTION

In order to display interlaced video signals on a progressive or sequential line display with high visual quality, it is necessary to 'deinterlace' interlaced odd and even fields of video signals into a sequentially continuous field of pixels without (inter-line) gaps. In addition, deinterlacing, prior to printing, results in higher quality still pictures from video.

In an interlaced video frame, each frame of pixels is composed of two time sequential fields—an even field and an odd field. Compared to a full frame of successive lines without missing lines of pixels, each (odd or even) field is subsampled by a factor of two in the vertical dimension, so that, as diagrammatically illustrated in FIG. 1, an even field contains data at only even-numbered line locations (e.g. lines 0, 2, 4, 6, and 8), and an odd field contains data at only odd-numbered line locations (e.g. lines 1, 3, 5, 7,). Thus, an even field has no pixel values for odd numbered lines of the full frame, and an odd field has no pixel values for even numbered line of the full frame.

In order to deinterlace an even (or an odd) field into a full frame without missing lines of pixels, it is necessary to estimate the missing odd (or even) lines. One well-known method for this purpose involves merging the even and odd fields together, namely simply filling in the missing lines of the odd (even) field with the lines of the immediately adjacent even (odd) field. Unfortunately, such an approach introduces "jitter" artifacts at portions of the image containing moving objects (i.e. objects that move within the time interval of two successive fields). On the other hand, merging provides optimal spatial resolution at steady image regions (namely at those pixel locations where the image does not change between successive fields).

Another approach is to concentrate on a single field only (i.e., the odd field) and interpolate the missing lines using spatial interpolation. One example of a relatively simple spatial interpolation technique involves bilinear interpolation, in which an average of the available pixel values in lines immediately above and below the pixel of interest in the missing line is assigned to the missing pixel. However, this method may cause artifacts if the missing pixel is over an edge whose orientation is not vertical.

To overcome these artifacts, an edge-adaptive spatial interpolation method, described in the U.S. Patent to Dougall et al., U.S. Pat. No. 5,019,903, entitled "Spatial Interpolation Between Lines Of A Supersampled Digital Video Signal In Accordance With A Gradient Vector Selected For Maximum Matching Of Blocks Of Samples Which Are Offset In Opposite Directions," has been proposed. The patented technique first attempts to determine the orientation of the image gradient at the missing pixel, and then interpolation is performed using image values that are located along this determined orientation, in order not to "cross an edge" and cause unwanted artifacts.

The Dougall et al. patent proposes that a potentially more effective method would be to use a hybrid scheme, where the deinterlacing process would switch, on a pixel-by-pixel basis, between merging and (edge-adaptive) spatial interpolation, depending on the dynamics of the image at the locations of the missing pixels, so that the reduced complexity advantages of using merging in steady regions of the image would be maintained.

In order to classify the dynamics of each pixel as either a "moving pixel" or "steady pixel," it would be necessary to employ a motion detection scheme as a precursor to choosing merging or interpolation. However, the Dougall et al patent offers no discussion as to how to implement such a mechanism.

In order to detect motion in an image, the contents of successive image fields of opposite polarity (even-odd or odd-even) can be compared with one another. However, the accuracy of motion detection can be increased significantly when two consecutive fields of the same polarity (i.e., an immediately preceding even (odd) field (i−1) and an immediately succeeding even (odd) field (i+1)), between which an odd (even) field (i) occurs, are utilized for motion detection.

The U.S. patent to Bennett et al., U.S. Pat. No. 4,472,732 describes a method which employs the pixel-to-pixel difference of neighboring fields with the same polarity (e.g. even fields) that immediately follow and precede the field to be deinterlaced (e.g. an odd field), in order to perform motion detection. The method then switches between merging and vertical interpolation depending upon the presence and absence of motion that is determined by thresholding the difference values.

Unfortunately, the use of single-pixel differences may falsely detect 'no motion' if the scene is such that the gray levels of the pixels being compared in the two neighboring fields are similar, even though there is motion in the scene. Such a situation may occur, for instance, in the case of scenes that contain a moving structure with text on it.

An example of this circumstance is illustrated in FIG. 2, where a 'no motion' decision is rendered at the (missing) pixel location (x,y) in the field at time t2, by differencing co-located values at fields at times t1 and t3, although there is motion at that pixel location. In this case, merging the fields at times t1 and t2 at pixel location (x,y) will result in artifacts due to this false classification. The occurrence of such false classifications is reduced by differencing and thresholding an $N1 \times N2$ block of pixels (e.g. $N1=N2=3$) rather than a single pixel. The benefits of using a $1 \times 2$ block (i.e. $N1=1$, $N2=2$), for instance, and thresholding the difference $(1/2)(f(x,y,t1)-f(x,y,t3)+(f(x+1,y,t1)-f(x+1,y,t3))$ to detect whether or not the missing pixel $f(x,y,t2)$ belongs to a moving region may be seen in FIG. 3, where $f(.,.,.)$ denotes the spatiotemporal distribution of the fields. A disadvantage of this multifield comparison approach is the fact that using two additional fields for motion detection necessarily increases the memory requirements of a typical hardware implementation.

SUMMARY OF THE INVENTION

In accordance with the present invention, a hybrid deinterlace scheme is employed, wherein motion detection is used as a precursor to select the value for each missing pixel of a deinterlaced frame. If the missing pixel is found to belong to a steady or non-motion portion of the image, then its value is replaced by the corresponding value in the adjacent field (i.e., merging is performed). Otherwise, (where image motion is present) spatial interpolation, preferably edge-adaptive interpolation, is employed to determine the value of the missing pixel.

The motion-detection mechanism employed in accordance with the present invention employs a set of three consecutive fields i−1, i, and i+1, where i denotes a field of a first polarity and i−1 and i+1 denote fields of a second polarity. Thus, where i corresponds to an odd field, fields i−1 and i+1 are consecutive even fields; where i denotes an even field, fields i−1 and i+1 are consecutive odd even fields. Namely, the present invention is directed a method of generating a digital output image comprised of successive lines of pixels from a plurality of immediately sequential interlaced image fields having successively opposite field polarities. The plurality of interlaced image fields comprise first and second image fields of a first field polarity and a third image field of a second field polarity, interposed between the first and second image fields.

As noted above, pursuant to the invention, image fields of the same polarity are compared with one another in order to detect motion. While this technique would normally require three field storage devices, counting the two fields required for motion detection and the field to be interlaced, in accordance with the invention less than three field storage devices or spaces can be used to process the data from three consecutive fields.

For this purpose, in accordance with a non-limiting example of the deinterlace methodology of the present invention, plural lines of pixel value signals representative of pixels of the first image field are stored in a first storage space, and pixel value signals representative of pixels of the third image field are stored in a second storage space.

A third storage space having a storage capacity sufficient to accommodate the number of missing pixels of the digital output image is provided for storing motion detection signals. Also provided is a fourth storage space having a plurality of storage locations sufficient to accommodate the storage of pixel values of pixels within a plurality of lines, but which is less than the total number of lines of the second image field. As plural lines of pixel values of the second image field are sequentially written into storage locations of the fourth storage space, they are processed and then overwritten by subsequent lines of pixels of the second image field.

The processing of successive lines of pixel values of the second image field being sequentially loaded into the fourth storage space involves identifying a corresponding pixel location in each of the first and second image fields for a respective pixel location of each line of the digital output image for which there is no image pixel in the third image field. For this corresponding pixel location in each of the first and second image fields, a sum signal representative of the average of differences between values of respective ones of pixels of the plurality of pixels neighboring the corresponding pixel location in each of the first and second image fields is generated.

This sum signal is then compared with a threshold. If the sum signal does not exceed the threshold a determination is made that there is no effective image motion between the first and second image fields, and a signal representative of the non-occurrence of motion at the respective pixel location is stored in its associated memory location in the third storage space. On the other hand, if the sum signal exceeds the threshold, a determination is made that there is effective image motion between the first and second image fields, and a signal representative of the occurrence of motion at the respective pixel location is stored in its associated memory location in the third storage space.

After each of the successive lines of missing pixels of the image field being deinterlaced are processed in the manner described above, the contents of the filled third storage space are employed to selectively generate the missing image pixels. The pixel value at a respective missing pixel location is selected to be either the value of a pixel located at the same pixel location in the first image field, or an interpolated pixel value derived as a function of one or more pixels in the third image. This function may be a linear function of pixels in a plurality of lines in the third image field which correspond to lines immediately adjacent to the line of digital output image containing the missing pixel location.

BRIEF DESCRIPTION OF THE DRAWINGS

FIG. 4 diagrammatically illustrates three successive image fields E1-01-E2 of interlaced video-representative pixels;

FIGS. 6(a)–6(c) diagrammatically illustrate respective states of a reduced capacity storage buffer in which successive lines of pixels of an image field are written in the course of performing image motion detection for specifying the contents of the image motion storage space of FIG. 5.

DETAILED DESCRIPTION

Figure 1:
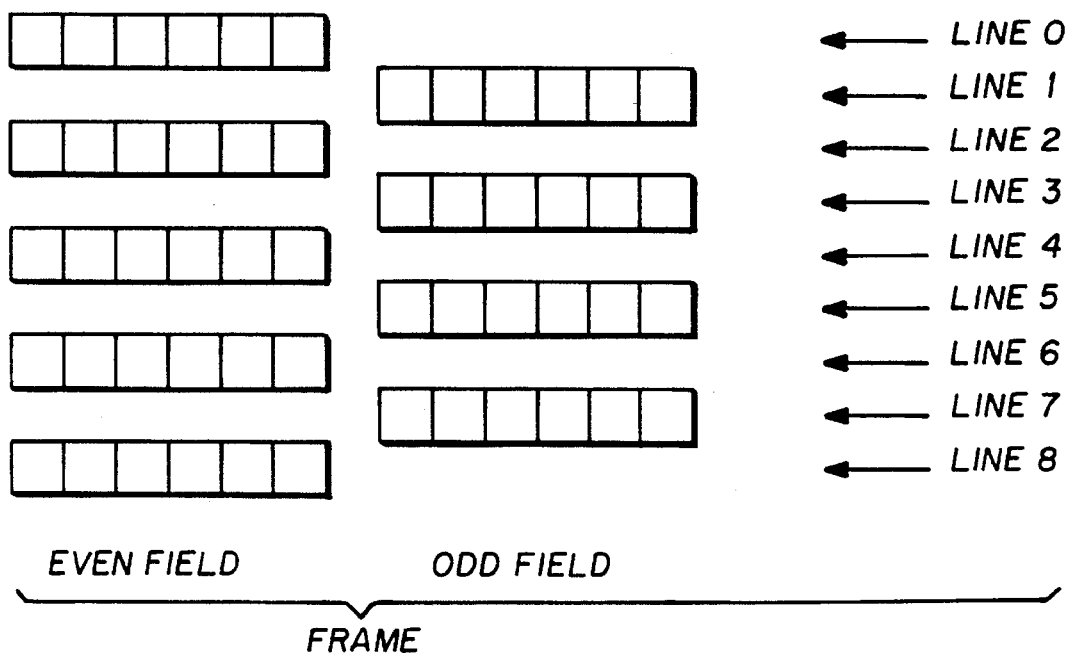
FIG. 1 diagrammatically illustrates an interlaced video frame composed of two time sequential fields—an even field and an odd field.
Figure 3:
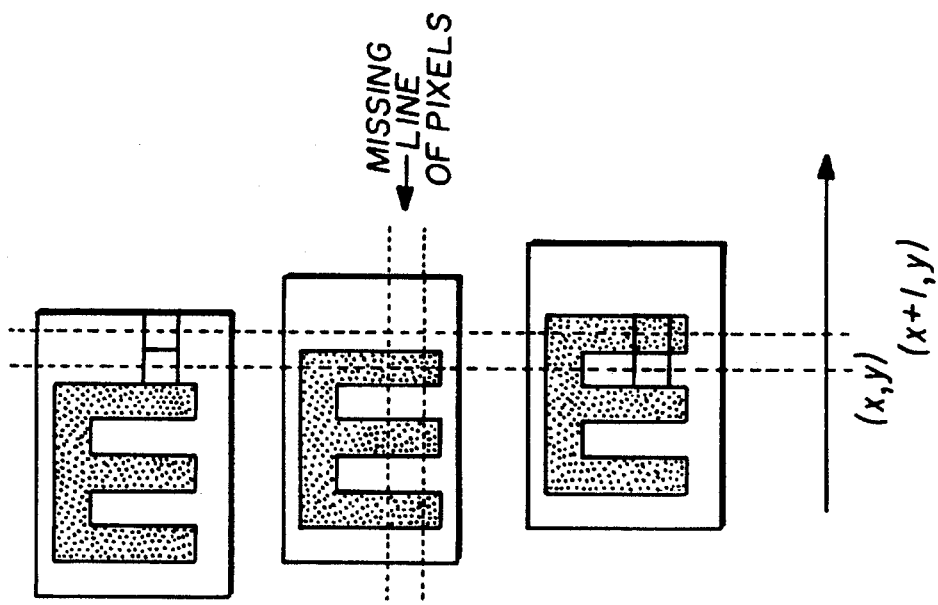
FIG. 3 illustrates increased reliability in motion detection by comparing a one-by-two block of pixels.
Figure 2:
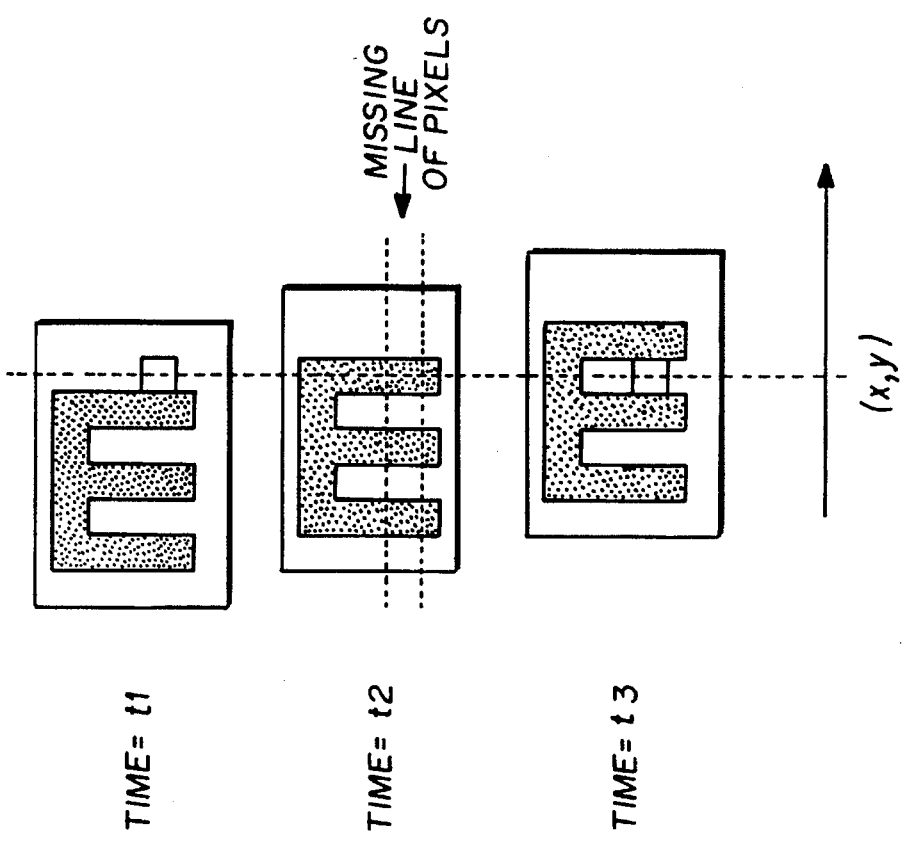
FIG. 2 depicts motion detection for a missing pixel located at spatial location (x,y) within a frame at time t2 using the existing co-located pixels within neighboring fields.

Before describing in detail the new and improved deinterlacing mechanism in accordance with the present invention, it should be observed that the present invention resides primarily in what is effectively a prescribed digital image processing technique that may be implemented by means of conventional digital signal processing circuitry, in particular, delay (shift register) components and arithmetic logic circuits, or may be embedded within image processing application software executable by the control processor of a digital image processing workstation, through which successive interlaced image fields of a scene are processed. The sources of such interlaced image fields may be conventional imaging hardware, such as interlaced lines of television signals derived from an NTSC system, as a non-limiting example, and are not considered part of the invention.

Consequently, the manner in which such interlaced image field sources are interfaced with either hardwired digital circuit components or a digital image processing workstation have been illustrated in the drawings in readily understandable block diagram format, which show only those specific details that are pertinent to the present invention, so as not to obscure the disclosure with details which will be readily apparent to those skilled in the art having the benefit of the description herein. Thus, the block diagram illustrations are primarily intended to illustrate the major components of the system in a convenient functional grouping, whereby the present invention may be more readily understood.

As pointed out briefly above, the deinterlace mechanism of the present invention is a hybrid scheme, wherein motion detection is used as a precursor to select the value for each missing pixel of a deinterlaced frame. The motion-detection mechanism employs a set of three consecutive fields i−1, i, and i+1, where i denotes a field of a first polarity and i−1 and i+1 denote fields of a second polarity. Thus, where i corresponds to an odd field, fields i−1 and i+1 are consecutive even fields; where i denotes an even field, fields i−1 and i+1 are consecutive odd even fields. If the motion detection mechanism identifies the location of a missing pixel to belong to a steady or non-motion portion of the image, then its value is to be replaced by the corresponding value in the adjacent field (i.e., merging is performed). Otherwise, (where image motion is present) spatial interpolation, preferably edge-adaptive interpolation, is employed to determine the value of the missing pixel.

Figure 4:
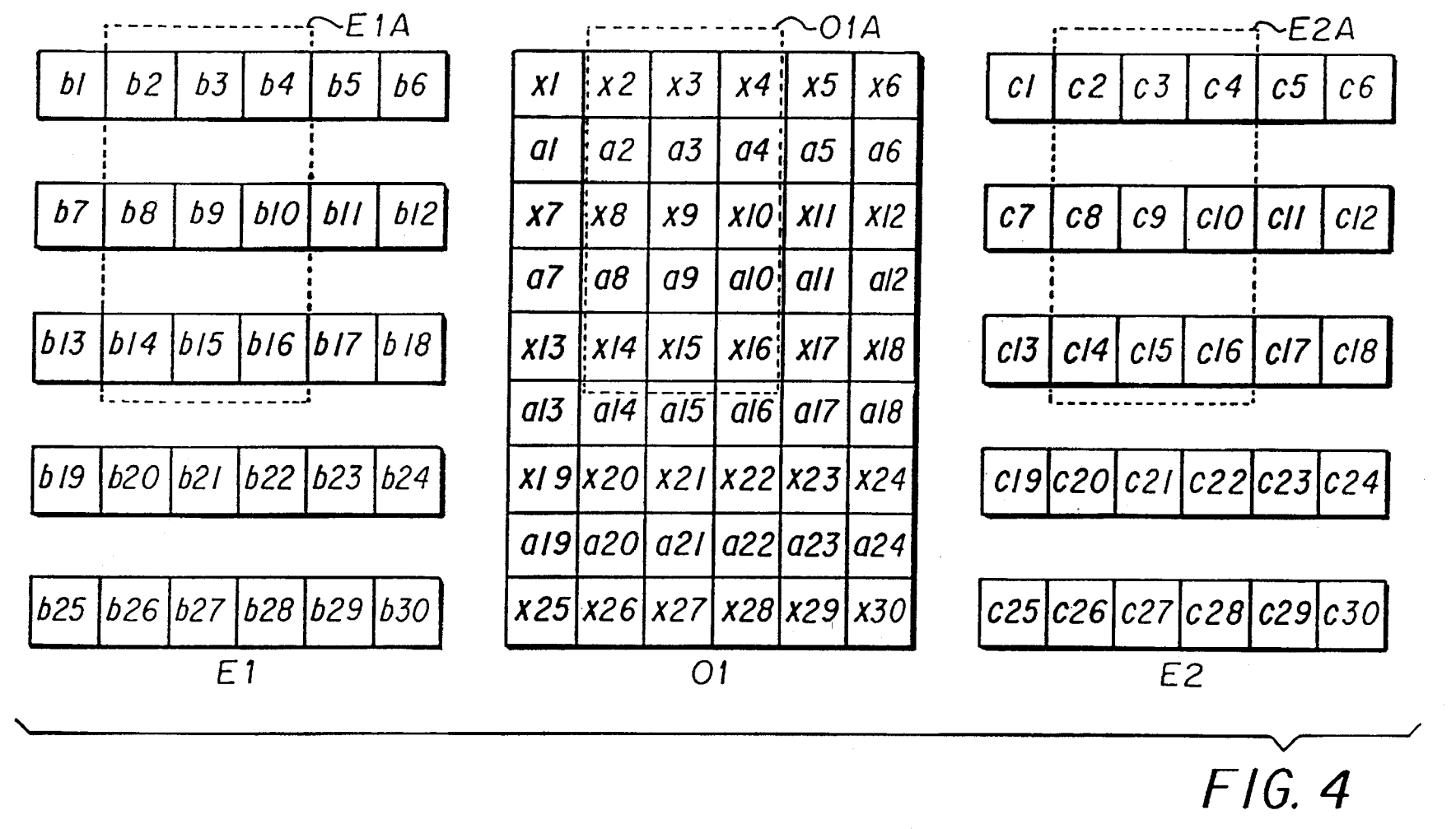

More particularly, FIG. 4 diagrammatically illustrates a non-limiting example of three successive image fields E1-O1-E2 of interlaced video-representative pixels which are to be processed to obtain a deinterlaced video field in which missing pixels are filled in with pixel values selected on the basis of a motion detection operation. For purposes of simplifying the drawings in the present example, the even fields E1 and E2 are diagrammatically illustrated as an array of five lines of six pixels per line, and the odd field O1 is diagrammatically illustrated as an array of four lines of six pixels per line.

For even field E1, the available field pixels are denoted by b1, b2, ..., b30 and for the next successive even field E2, the available pixels are denoted by c1, c2, ..., c30. For odd field O1, which is immediately adjacent and intermediate the even fields E1 and E2, the available pixels are denoted by a1, a2, ..., a24. The missing pixels of the odd field O1 are denoted by x1, x2, ..., x30. In the illustrated example, the problem of deinterlacing is to estimate the missing pixel values x1, x2, ..., x30 of odd field O1 using the available pixel values of each of the three fields.

Pursuant to the invention, merging or spatial interpolation is performed to estimate the values of the missing pixels, depending on the presence or absence of motion in the image at the locations of the missing pixels. Motion detection is performed for each one of the missing pixels x1, x2, ..., x30, and the result is stored as a binary value in a storage space diagrammatically illustrated at M in FIG. 5. As will be described, a respective storage location of the storage space M will contain a "1" if image motion is detected for the missing pixel location xi of interest and a "O" if there is no image motion for that missing pixel location.

Motion detection is performed by examining the contents of an array of N×N (i.e., 3×3 in this example) pixels from a first field (the even field E1) that immediately precedes and a second field (the even field E2) that immediately follows a third field (the odd field O1) of interest. For instance, for a missing pixel location x9 within a three-by-three array O1A in the odd field O1, there is an associated array E1A for immediately preceding even field E1 and a corresponding array E2A for immediately following even field E2.

For a corresponding pixel location in each of the first (E1) and second (E2) image fields, a sum signal representative of the average of differences between values of respective ones of pixels of the arrays E1A and E2A of pixels neighboring the corresponding pixel location in each of the first and second image fields is generated. In the present example of a three-by-three array, this sum signal value Sum may be represented for missing pixel location x9 as:

$$\text{Sum}_{x9}=(1/9)*(|b2-c2|+|b3-c3|+|b4-c4|+|b8-c8|+|b9-c9|+ |b10-c10|+|b14-c14|+|b15-c15|+|b16-c16|). \quad (1)$$

This sum signal $\text{Sum}_{x9}$ value is compared with a threshold T. If the sum signal exceeds the threshold value T, then it is concluded that there is effective relative image motion between the first and second image fields, and a "1" is written into storage location m9 of the storage space represented by the array M in FIG. 5. Otherwise, a "O" is written into storage location m9, indicating that there is no relative image motion at the location of missing pixel x9.

Where it has been determined that there is no relative image motion between image fields E1 and E2 at a respective missing pixel location xi, either the value of the corresponding pixel bi from even field E1, or the value of the corresponding pixel ci from even field E2 is employed to represent the pixel value at missing pixel location xi (in the odd field O1 of the present example).

On the other hand, where relative motion between image fields E1 and E2 has been detected, either direct vertical, or edge adaptive interpolation (such as that described in the above-referenced U.S. patent to Dougall et al No. 5,019,903) is performed. As noted above, the interpolated value may be represented as a linear function of a plurality of pixel values neighboring the missing pixel (x9 in the present example). For the odd image field O1, lines of available pixels immediately adjacent to (immediately above and below, as shown in FIG. 4) the line containing the missing pixel location x9 are the lines of pixels a1–a6 and a7–a12. Thus, the interpolated pixel value may be represented as a function y=f(a1, a2, a3, ..., a12). As a non-limiting example, for the case of direct vertical interpolation, the linear function y=(1/2)(a3+a9) may be used to generate the value of the missing pixel at location x9.

Where the location of the missing pixel is at a border location of the image field, the size of the array of pixels employed to perform motion detection and pixel interpolation may be reduced. For example, for missing pixel location x1 at the upper left hand border corner of the odd field image frame )O1 of FIG. 4, the sum signal value Sum may be derived from a two-by-two pixel array located at the upper left hand corner of each of the even fields E1 and E2. Namely, the sum signal value associated with missing pixel x1 may be expressed as:

$$\text{Sum}_{x1}=(1/4)*(|b1-c1|+|b2-c2|+|b7-c7|+|b8-c8|). \quad (2)$$

Figures 5, 7:
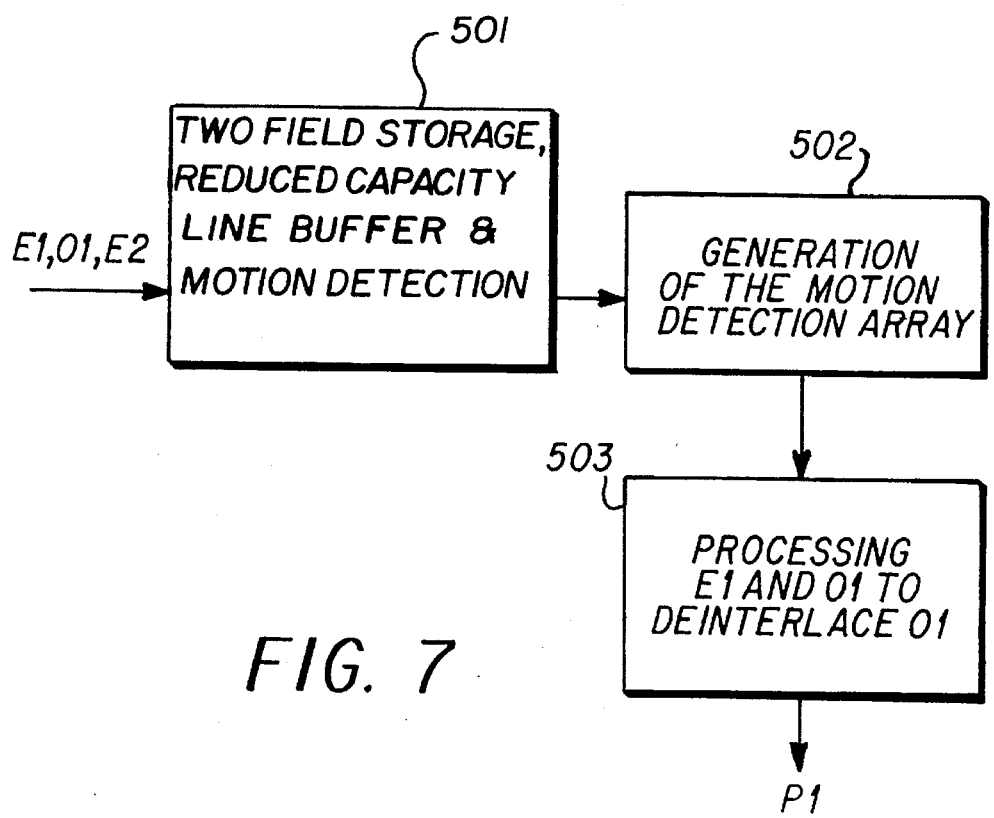
FIG. 5 diagrammatically illustrates an image motion storage space for storing binary motion detection values, and having a size equal to the number of total missing pixels of a deinterlaced image field.
FIG. 7 is a signal processing flow diagram for executing the deinterlacing process of the present invention.

If the sum signal value $\text{Sum}_{x1}$ exceeds the threshold value T, then it is concluded that there is effective relative image motion between the first and second image fields at missing pixel location x1, and a "1" is written into storage location m1 of the storage space represented by the array M in FIG. 5. Otherwise, a "O" is written into storage location m1, indicating that there is no relative image motion at the location of missing pixel x1.

Where the sum signal value comparison step determines that there is no relative image motion between image fields E1 and E2 at the missing pixel location x1, either the value of the corresponding pixel bi from even field E1, or the value of the corresponding pixel ci from even field E2 is written into a memory space for the deinterlaced output image (the odd field O1 of the present example).

Thus, for the border pixel location x1 of interest, if $Sum_{x1}<T$, indicating no effective relative motion between image fields at the missing image location, then x1=b1 or x1=c1. If $Sum_{x1}$ is equal to or exceeds T, indicating effective relative motion between image fields at the missing image location, then x1=f(a1, ..., an). For a border pixel x1 may be simply set to a1.

Similarly, for the 'border-adjacent' pixel location x5, the sum signal value Sum may be derived from a three-by-two pixel array located at the upper right hand corner of each of the even fields E1 and E2. Namely, the sum signal value associated with missing pixel x5 may be expressed as:

$$Sum_{x5}=(1/6)*(|b4-c4|+|b5-c5|+|b6-c6|+|b10-c10|+|b11-c11|+|b12-c12|). \quad (3)$$

Again, if $Sum_{x5}<T$, indicating no effective relative motion between image fields at the missing image location, then x5=b5 or x5=c5. If $Sum_{x5}$ is equal to or exceeds T, indicating effective relative motion between image fields at the missing image location, then x5=f(a1, ..., an). As a border-adjacent pixel, the value of missing pixel x5 may be simply set to a5.

In a like manner, for another 'border-adjacent' pixel location x12, the sum signal value Sum may be derived from a two-by-three pixel array located at the upper right hand corner of each of the even fields E1 and E2. Namely, the sum signal value associated with missing pixel x12 may be expressed as:

$$Sum_{x12}=(1/6)*(|b5-c5|+|b6-c6|+|b11-c11|+|b12-c12|+|b17-c17|+|b18-c18|). \quad (4)$$

Thus, if $Sum_{x12}<T$, indicating no effective relative motion between image fields at the missing image location, then x12=b12 or x12=c12. If $Sum_{x12}$ is equal to or exceeds T, indicating effective relative motion between image fields at the missing image location, then x12=f(a1, ..., an). As another border-adjacent pixel, the value of missing pixel x12 may be defined by the linear function x12=(1/2)*(a6+a12).

Further, for 'border-adjacent' pixel location x25, the sum signal value Sum may be derived from a two-by-two pixel array located at the lower left hand corner of each of the even fields E1 and E2. Namely, the sum signal value associated with missing pixel x25 may be expressed as:

$$Sum_{x25}=(1/4)*(|b19-c19|+|b20-c20|+|b25-c25|+|b26-c26|). \quad (5)$$

Thus, if $Sum_{x25}<T$, indicating no effective relative motion between image fields at the missing image location, then x25=b25 or x25=c25. If $Sum_{x25}$ is equal to or exceeds T, indicating effective relative motion between image fields at the missing image location, then x25=f(a1, ..., an). As a border-adjacent pixel, the value of missing pixel x25 may be simply set equal to the value of immediately adjacent pixel a19.

Although the foregoing method may can be carried out using a respective image field storage space or device for each of interlaced fields E1, O1, and E2 and a separate store for binary motion detection array M, it is possible to reduce the amount of hardware required to perform the above process, by employing a limited sized storage space for processing pixel data associated with one of the two image frames of the same field polarity, here even image frames E1 and E2.

More particularly, as will be described, all that are required are first and second storage spaces which, for the present example correspond, to a first field store associated with one of the even fields E1 and E2 of FIG. 4 (e.g. even field E1), and a second field store associated with the odd image frame O1, a third storage space for the motion detection array, corresponding to motion decision storage space M shown in FIG. 5, and a fourth storage space having a storage capacity of n lines of pixels, where n is less than the number of lines of the other image field (e.g. even field E2).

In the following non-limiting example, respective first and second storage spaces are dedicated to storing even image field E1 and odd image field O1, respectively, in order to obtain the values of missing pixels xi to be used in deinterlacing the odd field O1. The pixel contents of the other even field E2 are to be used only for motion detection, so that a lower capacity buffer B may be used to store successive lines of the even field E2. Since, the contents of the even field will not be used to derive the missing pixel values, then, if the sum signal value $Sum_{xi}<T$, indicating no relative motion between images E1 and E2, the value of xi is set at bi (ci is not used).

The manner in which successive lines of the even field E2, following the odd field of interest O1, can be stored in a n-line buffer and used to generate the values of the motion detection map stored in motion decision storage space M is diagrammatically shown in FIGS. 6(a)–6(c) and in the accompanying process flow diagram of FIG. 7 and proceeds as follows. At step 501, pixel values ci of the successive lines of even frame E2 are clocked into buffer B sequentially. When the pixel value c8 is clocked in, a motion/no-motion decision for x1 can be effected as set forth in equation (2), using, as appropriate, the pixel value b1 associated with the even field E1, and a binary value is written into location m1 of motion decision storage space M being generated or assembled at step 502.

Next, when the pixel value c9 is clocked into buffer B, a decision for missing pixel x2 is effected, as set forth in equation (3) and so on. After pixel value c18 has been clocked into buffer B, a motion/no-motion decision can be made for missing pixel locations x11 and x12, as in equation (4) and appropriate binary values are written into storage locations m11 and m12 of motion decision storage space M. At this time, the contents of buffer B are as diagrammatically shown in FIG. 6(a), and motion-representative value is contained in each of the locations m1 to m12 of motion decision storage space M.

Next, pixels c19 and c24 are clocked into the first line of buffer B replacing pixel values c1 to c6, as shown in FIG. 6(b). As new pixels values from even field E2 are sequentially clocked into buffer B, motion/no-motion decisions are made for missing pixels locations x13 to x18, and resulting motion/no motion-representative binary values are written into locations m13 to m18 of motion decision storage space M. Finally, as shown in FIG. 6(c), pixel values c25 to c30 from even field E2 are clocked into the second line of buffer B, replacing values c7 to c12 and motion/no-motion decisions are made for missing pixel locations x19 to x30.

Once the motion decision storage space M is filled, step 502 is complete and the contents of motion decision storage space M are used to implement the merging/spatial interpolation process described above. Namely, if mi=0 then xi=bi; otherwise a spatial interpolation of the odd field values is performed to determine xi as set forth in Equations (1)–(5).

Once the pixel values for missing pixel locations x1 to x30 have been determined, odd field O1 will have been converted into a nine line by six pixels per line deinterlaced field P1 containing pixel locations a1 to a30 and x1 to x30, as shown at step 503. It should be noted that the estimated values of P1, x1 to x30, can be stored in the storage space for even field E1. Then suitable post-processing, such as sharpening and/or printing, can be applied to the deinterlaced image P1.

As described earlier, the deinterlacing method of the present invention may be readily implemented using conventional digital signal processing components including delay circuitry and arithmetic logic circuits. It should be noted that motion detection is not performed prior to acquisition of the first line plus two pixels from the next line (C1–C8) of the second even field.

In the case of fields of color video signals, the memory efficient motion detection system described above is applied to the luminance component of the signal. Hence, if the input data is not represented by a luminance and two associated chrominance channels (YCC), a transformation is performed to determine the luminance component (e.g. a RGB-to-YUV transformation). In the deinterlace process, step 503 of FIG. 7, in the preferred embodiment, merging and spatial interpolation is applied to each of the three color channels individually, according to the motion map.

Advantageously, currently available digital signal processing circuitry is fast enough to perform motion detection for a missing pixel location xi before missing pixel xi+1 is acquired. A typical NTSC video digitizer digitizes a video signal to 640 pixels. For NTSC signals comprising 525 lines/(1/30) sec. yields 15.75 lines/msec. For 640 pixels, the pixel time is 10.08 microseconds, which is well within the cycle time of present day processors. For example, the clock cycle for a 14 MHz processor is 720 nanoseconds. The arithmetic operations to be performed for motion detection within this time interval include, at most, nine subtractions, nine comparisons (for absolute values), eight additions and a single multiplication (to form a normalized Sum). By "at most" is meant that the number of operations decreases for pixels at boundaries with decreasing window size. Also, the summation value Sum can be efficiently computed for two neighboring locations; as a three-by-three measurement window slides through the pixels, it is not necessary to recompute the differences over all nine pixels.

As will be appreciated from the foregoing description, the hybrid deinterlace scheme of the present invention provides an effective mechanism for selecting, on a pixel-by-pixel basis, between merging and (edge-adaptive) spatial interpolation, in accordance with relative image motion at locations of the missing pixels of a deinterlaced image frame, so that the reduced complexity advantages of using merging in steady regions of the image may be maintained, yet obviates the problem of edge-based artifacts, by employing an edge-adaptive spatial interpolation method when relative motion is detected. In order to enhance the accuracy of motion detection two consecutive fields of the same polarity are utilized for motion detection. The supposed hardware penalty of using such a multifield comparison approach is circumvented by employing one of the fields for motion detection, only, so that a reduced size buffer may be used for the purpose.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

PARTS LIST

501 Efficient storage and motion detection.
502 Generation of the motion detection array.
503 Processing E1 and O1 to deinterlace O1.

What is claimed:

1. A method of generating a digital output image comprised of successive lines of pixels from a plurality of immediately sequential interlaced image fields having successively opposite field polarities, said plurality of interlaced image fields comprising first and second image fields of a first field polarity and a third image field of a second field polarity, interposed between said first and second image fields, comprising the steps of:

(a) storing pixel value signals representative of pixels of said first image field in a first storage space;

(b) storing pixel value signals representative of pixels of said third image field in a second storage space:

(c) providing a third storage space having a storage capacity sufficient to accommodate the number of missing pixels of said digital output image;

(d) providing a fourth storage space having a plurality of storage locations sufficient to accommodate the storage of pixel values of pixels within a plurality of lines, the number of which is less than the total number of lines of said second image field;

(e) sequentially writing plural lines of pixel values of said second image field into storage locations of said fourth storage space;

(f) for a respective pixel location of each line of said digital output image for which there is no image pixel in said third image field, generating a signal representative of the occurrence or non-occurrence of motion at said respective pixel location in the image represented by said first and second image fields, and storing said signal generated in step in a respective storage location of said third storage space associated with said respective pixel of said digital output image; and (g) selectively generating said missing image pixel as either a pixel located at the same pixel location in one of said first and second image fields, or generating said missing image pixel as a function of one or more pixels in said third image, in accordance with said signal generated and stored in step (f).

2. A method according to claim 1, wherein step (f) comprises:

(f1) for a respective pixel location of each line of said digital output image for which there is no image pixel in said third image field, identifying a corresponding pixel location in each of said first and second image fields;

(f2) for the corresponding pixel location in each of said first and second image fields, generating a sum signal representative of the average of differences between values of respective ones of pixels of the plurality of pixels neighboring said corresponding pixel location in each of said first and second image fields;

(f2) generating a signal representative of the occurrence or non-occurrence of motion at said respective pixel location in the image represented by said first and second image fields in accordance with a prescribed relationship between said sum signal and a threshold value; and (f3) storing the signal generated in step (h) in a respective storage location of said third storage device associated with said respective pixel of said digital output image.

3. A method according to claim 1, wherein step (g) comprises selectively generating said missing image pixel as a pixel located at the same pixel location in said one of said first and second image fields in dependence upon said signal generated in step (f) being representative of a lack of image motion at said respective pixel location in said first and second image fields.

4. A method according to claim 1 wherein step (g) comprises generating said missing image pixel as a function of one or more pixels in said third image field, in dependence upon the occurrence of image motion at said respective pixel location in said first and second image fields.

5. A method according to claim 4, wherein step (g) comprises generating said missing image pixel as a function of a plurality of pixels in said third image field, in dependence upon the occurrence of image motion at said respective pixel location in said first and second image fields.

6. A method according to claim 4, wherein step (g) comprises generating said missing image pixel as corresponding to an individual pixel in said third image field, in dependence upon the occurrence of image motion at said respective pixel location in said first and second image fields.

7. A method according to claim 6, wherein step (g) comprises generating said missing image pixel as corresponding to an individual pixel located in a border region of said third image field, upon the occurrence of image motion at said respective pixel location in said first and second image fields.

8. A method according to claim 3, wherein step (g) comprises generating said missing image pixel as a linear function of pixels in a plurality of lines in said third image field, in dependence upon the occurrence of image motion at said respective pixel location in said first and second image fields.

9. A method according to claim 8, wherein said plurality of lines in said third image field correspond to lines immediately adjacent to said each line of said digital output image.

* * * * *